US010764564B2

(12) United States Patent
Haseltine et al.

(10) Patent No.: US 10,764,564 B2
(45) Date of Patent: Sep. 1, 2020

(54) USER TRACKING STEREOSCOPIC IMAGE DISPLAY SYSTEM

(71) Applicant: Disney Enterprises, Inc., Burbank, CA (US)

(72) Inventors: Eric C. Haseltine, Burbank, CA (US); Nathan Nocon, Valencia, CA (US); Elliott Baumbach, Porter Ranch, CA (US); Clifford Wong, Burbank, CA (US); Jonathan R. Hsu, Pomona, CA (US); Michael P. Goslin, Sherman Oaks, CA (US)

(73) Assignee: Disney Enterprises Inc., Burbank, CA (US)

( * ) Notice: Subject to any disclaimer, the term of this patent is extended or adjusted under 35 U.S.C. 154(b) by 2 days.

(21) Appl. No.: 16/224,717

(22) Filed: Dec. 18, 2018

(65) Prior Publication Data
US 2020/0195911 A1 Jun. 18, 2020

(51) Int. Cl.
*H04N 13/302* (2018.01)
*H04N 13/144* (2018.01)
(Continued)

(52) U.S. Cl.
CPC ........... *H04N 13/302* (2018.05); *G02B 30/27* (2020.01); *G06F 3/013* (2013.01); *H04N 13/144* (2018.05); *G06F 3/012* (2013.01)

(58) Field of Classification Search
None
See application file for complete search history.

(56) References Cited

U.S. PATENT DOCUMENTS

| 4,687,167 A | 8/1987 | Skalka |
| 4,943,851 A | 7/1990 | Lang |

(Continued)

FOREIGN PATENT DOCUMENTS

| JP | S58-154913 U | 10/1983 |
| JP | H1-280992 A | 11/1989 |

(Continued)

OTHER PUBLICATIONS

Wetzstein, Gordon, Douglas Lanman, Matthew Hirsch, and Ramesh Raskar. "Tensor Displays: compressive light field synthesis using multilayer displays with directional backlighting" ACM Transactions on Graphics 31, No. 4 (Jul. 1, 2012) (Year: 2012).*

(Continued)

*Primary Examiner* — Stuart D Bennett
(74) *Attorney, Agent, or Firm* — Farjami & Farjami LLP

(57) ABSTRACT

According to one implementation, a stereoscopic image display system includes a computing platform having one or more hardware processor(s), a system memory storing a software code, an autostereoscopic display, and a user tracking unit controlled by the hardware processor(s). The hardware processor(s) execute the software code to utilize the user tracking unit to detect a left eye location and a right eye location of a user of the stereoscopic image display system, and to determine a left eye image and a right eye image corresponding to an output image of a content being played out by the stereoscopic image display system based on the respective left eye location and right eye location of the user. The hardware processor(s) further execute the software code to render the left eye image and the right eye image using the autostereoscopic display to generate a three-dimensional (3D) image of the output image.

15 Claims, 8 Drawing Sheets

(51) Int. Cl.
*G06F 3/01* (2006.01)
*G02B 30/27* (2020.01)

(56) References Cited

U.S. PATENT DOCUMENTS

| | | | |
|---|---|---|---|
| 5,057,827 A | 10/1991 | Nobile | |
| 5,148,310 A | 9/1992 | Batchko | |
| 5,239,892 A | 8/1993 | Sakai | |
| 5,437,235 A | 8/1995 | Randolph | |
| 5,714,997 A | 2/1998 | Anderson | |
| 6,115,006 A | 9/2000 | Brotz | |
| 6,183,088 B1 | 2/2001 | LoRe | |
| 6,208,318 B1 | 3/2001 | Anderson | |
| 6,481,851 B1 | 11/2002 | McNelley | |
| 6,801,185 B2 | 10/2004 | Salley | |
| 7,002,604 B1 | 2/2006 | Barrus | |
| 7,477,252 B2 | 1/2009 | Chun | |
| 7,490,941 B2 | 2/2009 | Mintz | |
| 7,587,120 B2 | 9/2009 | Koo | |
| 7,708,640 B2 | 5/2010 | Burak | |
| 8,233,032 B2 | 7/2012 | Yukich | |
| 8,698,966 B2 | 4/2014 | Liu | |
| 9,053,660 B2 | 6/2015 | Liu | |
| 9,186,595 B1 | 11/2015 | Cannon | |
| 10,310,284 B1 | 6/2019 | Waldron | |
| 2003/0142067 A1 | 7/2003 | Kurtenbach | |
| 2004/0082283 A1 | 4/2004 | Lindell | |
| 2004/0196362 A1* | 10/2004 | Hoshino | H04N 13/218 348/51 |
| 2005/0035962 A1 | 2/2005 | Ishibashi | |
| 2005/0083570 A1 | 4/2005 | Ueda | |
| 2005/0284997 A1 | 12/2005 | Tisbo | |
| 2007/0293299 A1 | 12/2007 | Aida | |
| 2009/0312979 A1 | 12/2009 | Pan | |
| 2010/0007582 A1 | 1/2010 | Zalewski | |
| 2011/0199373 A1 | 8/2011 | Liu | |
| 2012/0194419 A1 | 8/2012 | Osterhout | |
| 2012/0293941 A1 | 11/2012 | Myerchin | |
| 2013/0050198 A1 | 2/2013 | Song | |
| 2013/0092805 A1 | 4/2013 | Funk | |
| 2013/0100126 A1 | 4/2013 | Kim | |
| 2013/0100358 A1 | 4/2013 | De Collibus | |
| 2013/0343743 A1 | 12/2013 | Yen | |
| 2014/0118271 A1 | 5/2014 | Lee | |
| 2014/0307068 A1* | 10/2014 | Song | H04N 13/368 348/54 |
| 2015/0193084 A1 | 7/2015 | Juni | |
| 2015/0212718 A1 | 7/2015 | Kellhammer | |
| 2015/0288857 A1 | 10/2015 | Fay | |
| 2017/0038829 A1 | 2/2017 | Lanier | |
| 2017/0115488 A1 | 4/2017 | Ambrus | |
| 2017/0343804 A1 | 11/2017 | Choi | |
| 2018/0024373 A1 | 1/2018 | Joseph | |
| 2018/0224678 A1 | 8/2018 | Jung | |
| 2019/0156710 A1 | 5/2019 | Hanson | |

FOREIGN PATENT DOCUMENTS

| | | |
|---|---|---|
| JP | H9-238369 A | 9/1997 |
| JP | 2004-54150 A | 2/2004 |
| JP | 2005-221946 A | 8/2005 |
| JP | 2005-275398 A | 9/2005 |
| JP | 2010-273013 A | 12/2010 |

OTHER PUBLICATIONS

Horimai, Hideyoshi, et al. "Full-Color 3D Display System with 360 Degree Horizontal Viewing Angle." *Proc. Int. Symposium of 3D and Contents*, 2010. pp. 1-4.

File History of Related U.S. Appl. No. 15/888,896, filed Feb. 5, 2018, and titled "Floating Image Display System".

File History of Related U.S. Appl. No. 15/985,477, filed May 21, 2018, and titled "Electrical Charger for a Spinning Device".

File History of Related U.S. Appl. No. 15/985,502, filed May 21, 2018, and titled "Display of a Floating Image With Depth Enhancement".

File History of Related U.S. Appl. No. 15/983,006, filed May 17, 2018, and titled "Multi-Perspective Display of an Image".

File History of Related U.S. Appl. No. 16/011,505, filed Jun. 18, 2018, and titled "Image Display System With Visual Filter".

File History of Related U.S. Appl. No. 16/002,947, filed Jun. 7, 2018, and titled "Image Generation System Including a Spinning Display".

File History of Related U.S. Appl. No. 16/197,198, filed Nov. 20, 2018, and titled "Communication System Generating a Floating Image of a Remote Venue".

Yasuhiro Suzuk, et al. "Research of Real World Life-Sized Video Avatar Presentation System," *Proceedings of the Virtual Reality Society of Japan Annual Conference 10*, Sep. 29, 2005, pp. 111-114.

Hikechi Maeda, et al. "Experimental Development and Evaluation of All-Around Display System for Video Avatar in the Real World," *Proceedings of the Virtual Reality Society of Japan Annual Conference 8*, Sep. 3, 2003.

* cited by examiner

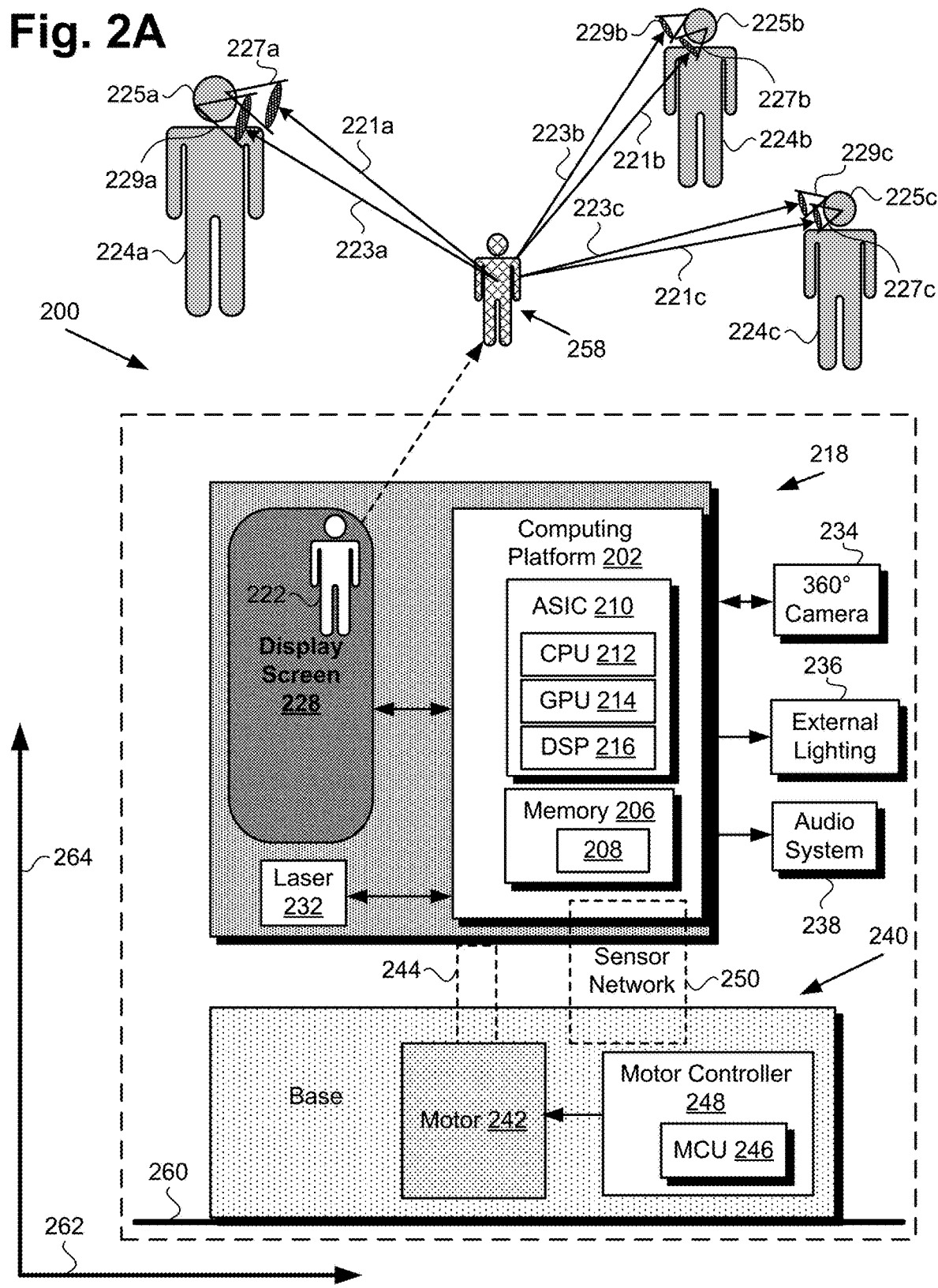

USER TRACKING STEREOSCOPIC IMAGE DISPLAY SYSTEM

BACKGROUND

Popular communication devices such as smartphones and tablet computers typically include a display providing a two-dimensional (2D) image. As a result, and despite their ability to display sharp, richly featured, high definition images, the experience of a user viewing such images is less immersive than if the images were being viewed as three-dimensional (3D) images. Despite the desirability of 3D imagery for users, several significant obstacles to its wider use exist. For example, in order to enjoy 3D movie or television content, a user must typically wear 3D glasses. Moreover, projection of 3D images usually requires multiple projectors, augmented reality (AR) headgear, and/or other complex display technologies. Additional complications can arise if the 3D image is to be viewed from more than one perspective and by more than one user at the same time.

SUMMARY

There are provided stereoscopic image display systems, substantially as shown in and/or described in connection with at least one of the figures, and as set forth more completely in the claims.

BRIEF DESCRIPTION OF THE DRAWINGS

FIG. 2A shows a diagram of an exemplary stereoscopic image display system, according to another implementation;

DETAILED DESCRIPTION

Figure 1A:
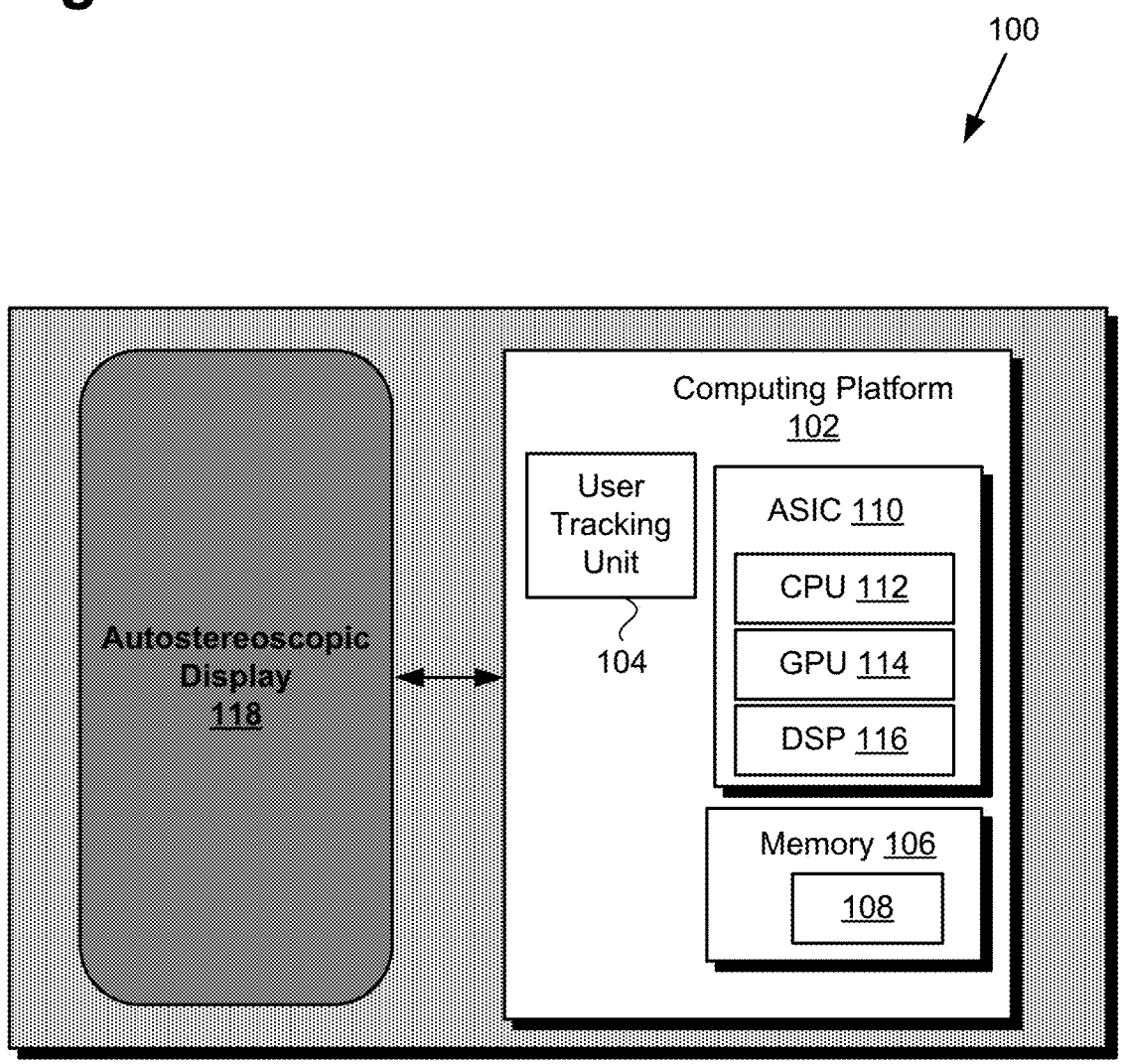
FIG. 1A shows a diagram of an exemplary stereoscopic image display system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A shows a diagram of exemplary stereoscopic image display system 100, according to one implementation. As shown in FIG. 1A, stereoscopic image display system 100 includes autostereoscopic display 118 communicatively coupled to computing platform 102. As further shown in FIG. 1A, computing platform 102 includes user tracking unit 104, application specific integrated circuit (ASIC) 110 including central processing unit (CPU) 112 implemented as a hardware processor, graphics processing unit (GPU) 114 also implemented as a hardware processor, and may further include digital signal processor (DSP) 116. Computing platform 102 also includes system memory 106 implemented as a non-transitory storage device storing software code 108.

It is noted that, as used in the present application, the terms "central processing unit" or "CPU" and "graphics processing unit" or "GPU" have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 108, from system memory 106. A GPU is configured to reduce the processing overhead of the CPU by performing computationally intensive graphics processing tasks.

In addition, the terms "render" and "rendering" are defined to mean causing one or more images to appear on a display screen, such as autostereoscopic display 118 for example. Thus, rendering an image may mean causing an entirely new image to appear on the display screen, or refreshing an image previously appearing on the display screen.

Figure 1B:
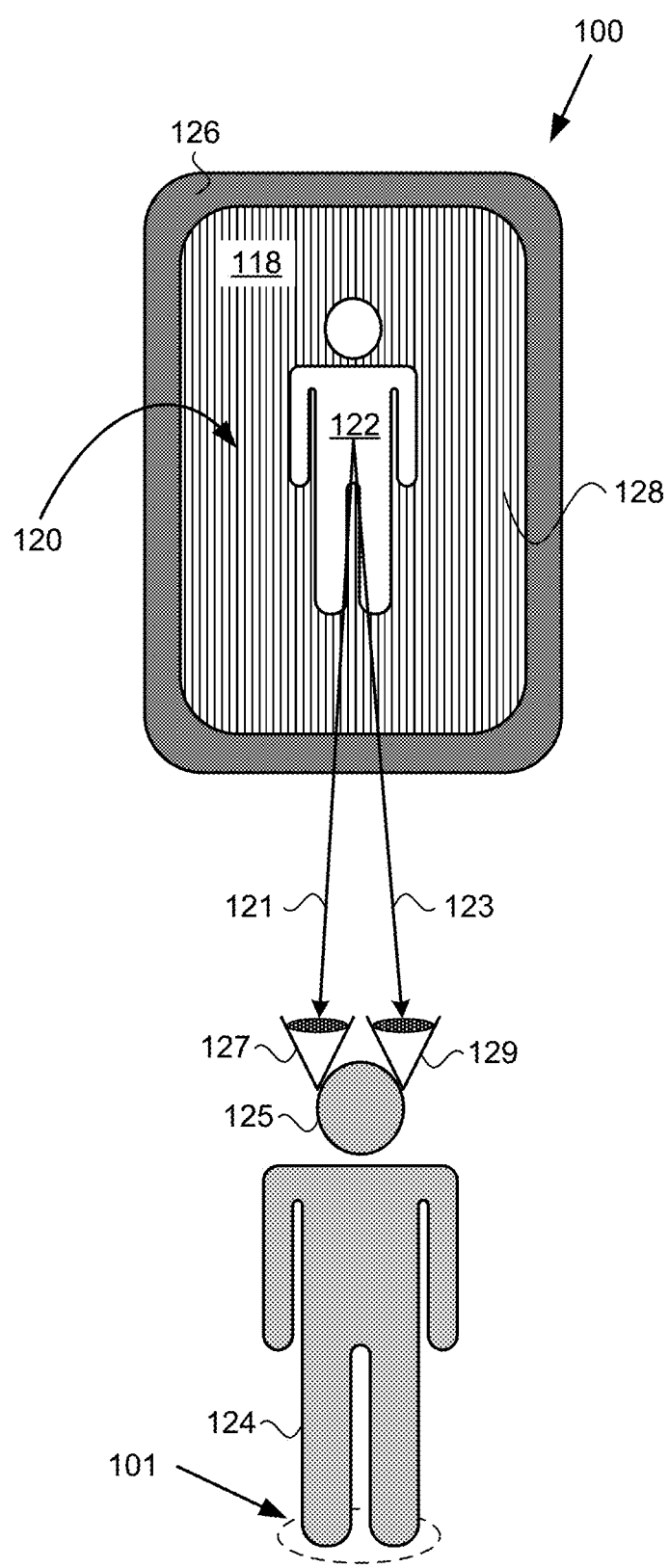
FIG. 1B shows an exemplary use case for the stereoscopic image display system of FIG. 1A, according to one implementation.

FIG. 1B shows an exemplary use case for stereoscopic image display system 100, according to one implementation. It is noted that any features in FIG. 1B identified by reference numbers identical to those appearing in FIG. 1A correspond respectively to those previously identified features. Thus, although not shown in FIG. 1B, stereoscopic image display system 100 in that figure includes features corresponding to user tracking unit 104, ASIC 110 including CPU 112, GPU 114, and DSP 116, as well as system memory 106 storing software code 108. Moreover, as shown in FIG. 1B, stereoscopic image display system 100 may be integrated with mobile communication device 126 having display screen 128. Mobile communication device 126 may take the form of a smartphone or tablet computer, for example.

In addition to stereoscopic image display system 100 integrated with mobile communication device 126, FIG. 1B shows user 124 of stereoscopic image display system 100 having head 125, left eye 127, and right eye 129. Also shown in FIG. 1B are left eye image 121 and right eye image 123 corresponding to output image 122 of content being played out by stereoscopic image display system 100, location 101 of user 124 relative to autostereoscopic display 118, and optional autostereoscopic surface layer 120 substantially covering display screen 128.

With respect to autostereoscopic surface layer 120, it is noted that in some implementations, autostereoscopic display 118 may be inherently autostereoscopic, in which use case autostereoscopic surface layer 120 may be omitted. For example, in one implementation, autostereoscopic display 118 may take the form of a compressive light field display omitting autostereoscopic surface layer 120. However, in other implementations, autostereoscopic display 118 may include display screen 128 configured to render two-dimensional (2D) images, such as a liquid-crystal display (LCD) display screen or an organic light-emitting diode (OLED)

display screen for example, and may include autostereoscopic surface layer 120. In those latter implementations, autostereoscopic surface layer 120 may take the form of a lenticular lens or a parallax barrier, for example, substantially covering display screen 128.

According to the implementation shown by FIGS. 1A and 1B, user tracking unit 104 is controlled by CPU 112 of ASIC 110 and is utilized by software code 108 to perform head tracking and/or eye tracking of user 124. For example, user tracking unit 104 may include a light source, such as an infrared light source for example, and a video camera or other optical sensor for detecting reflected light from left eye 127 and right eye 129 of user 124 (light source and optical sensor not shown in FIGS. 1A and 1B). As another example, user tracking unit 104 may include one or more cameras and utilize head and/or facial image recognition techniques to locate the center point of the user's head and/or eyes based on an average user's interpupillary distance ("IPD") by using a look-up table, for example.

Software code 108, executed by CPU 112 of ASIC 110, utilizes user tracking unit 104 to detect the respective locations of left eye 127 and right eye 129 of user 124. Based on the locations of left eye 127 and right eye 129, software code 108 is further executed by CPU 112 of ASIC 110 to determine left eye image 121 and right eye image 123 corresponding to output image 122. In addition, software code 108 may be executed by CPU 112 of ASIC 110 to utilize GPU 114 to render left eye image 121 and right eye image 123 using autostereoscopic display 118 to generate a three-dimensional (3D) image of output image 122 for user 124 from a perspective that corresponds to location 101 of user 124 relative to autostereoscopic display 118, as well as to the pose or orientation of head 125 of user 124.

FIG. 2A shows a diagram of exemplary stereoscopic image display system 200, according to another implementation. As shown in FIG. 2A, stereoscopic image display system 200 includes autostereoscopic display 218 configured to rotate, coupled to stationary base 240 by rotor 244. Autostereoscopic display 218 includes computing platform 202 communicatively coupled to display screen 228, as well as to laser 232, 360° degree camera 234, external lighting 236, and audio system 238.

As further shown in FIG. 2A, computing platform 102 includes ASIC 210 including CPU 212 implemented as a hardware processor, GPU 214 also implemented as a hardware processor, and may further include DSP 216. Computing platform 202 also includes system memory 206 implemented as a non-transitory storage device storing software code 208.

According to the exemplary implementation shown in FIG. 2A, base 240 includes motor 242 for rotating rotor 244 and autostereoscopic display 218, and motor controller circuit 248 including motor control unit (MCU) 246. Base 240 is situated on surface 260, which may be a floor or any other substantially horizontal surface. In addition, FIG. 2A shows horizontal axis 262 substantially parallel to surface 260, and vertical axis 264 substantially perpendicular to surface 260. Also shown in FIG. 2A are sensor network 250 bridging base 240 and autostereoscopic display 218, output image 222 corresponding to content being played out by stereoscopic image display system 200, and users 224a, 224b, and 224c of stereoscopic image display system 200.

As further shown in FIG. 2A, user 224a has head 225a, left eye 227a receiving left eye image 221a from autostereoscopic display 218, and right eye 229a receiving right eye image 223a from autostereoscopic display 218. In addition, user 224b has head 225b, left eye 227b receiving left eye image 221b, and right eye 229b receiving right eye image 223b, while user 224c has head 225c, left eye 227c receiving left eye image 221c, and right eye 229c receiving right eye image 223c. It is noted that the combination of computing platform 202 of autostereoscopic display 218, sensor network 250, and motor controller circuit 248 of base 240 enable the necessary time synchronization between the revolutions per second (rps) of motor 242 and rotor 244, and the frame rate in frames per second (fps) at which autostereoscopic display 218 renders 3D image or images 258 corresponding to output image 222 for each of users 224a, 224b, and 224c.

It is further noted that, for the purposes of the present application, the term "perspective" refers to the particular viewing angle and radial distance from which an image is viewed by a user. Referring to FIG. 2A, for example, the respective perspectives of 3D image 258 corresponding to output image 222 and viewed by users 224a, 224b, and 224c refers in part to the respective viewing angles of users 224a, 224b, and 224c with respect to a circle substantially concentric with rotor 244, in a plane substantially perpendicular to vertical axis 264. The respective perspectives of 3D image 258 corresponding to output image 222 and viewed by users 224a, 224b, and 224c also refers in part to the respective radial distances of users 224a, 224b, and 224c from rotor 244, in a plane substantially parallel to horizontal axis 262. It is also noted that although FIG. 2A shows three users 224a, 224b, and 224c, that representation is provided merely for conceptual clarity. More generally, users 224a, 224b, and 224c may correspond to a single user, or to more or many more than three users of stereoscopic image display system 200.

Users 224a, 224b, and 224c may be positioned so as to view 3D image 258 corresponding to output image 222 from a variety of perspectives. For example, in some implementations, users 224a, 224b, and 224c may be situated so as to view 3D image 258 corresponding to output image 222 from a number of discrete perspectives, such as three discrete perspectives located approximately 120° apart on an imaginary 360° circle surrounding autostereoscopic display 218. However, in other implementations, users 224a, 224b, and 224c may be able to view 3D image 258 corresponding to output image 222 from the perspective of any position on such an imaginary circle surrounding autostereoscopic display 218.

Although FIG. 2A depicts external lighting 236 and audio system 238 as communicatively coupled to, but not structurally integrated with, autostereoscopic display 218, that representation is merely exemplary. In other implementations, one or both of external lighting 236 and audio system 238 may be structurally integrated with autostereoscopic display 218. Thus, in various implementations, autostereoscopic display 218 can include one or more of external lighting 236 and audio system 238, in addition to computing platform 202 and display screen 228.

External lighting 236 may include strobe lighting components that are wholly integrated with autostereoscopic display 218, may include strobe lighting components controlled by computing platform 202 but remote from autostereoscopic display 218, or may be partially integrated with autostereoscopic display 218 while including remote strobe lighting components.

Analogously, audio system 238 may be wholly integrated with autostereoscopic display 218, may include elements, such as audio speakers, controlled by computing platform 202 but remote from autostereoscopic display 218, or may be partially integrated with autostereoscopic display 218 while including remote audio elements. In one implementation, audio system 238 may include a theater quality Dolby® high definition (HD) surround-sound system, for example.

According to the exemplary implementation shown in FIG. 2A, stereoscopic image display system 200 includes an image capture device in the form of 360° camera 234 communicatively coupled to computing platform 202. It is noted that, in some implementations, 360° camera 234 may be communicatively coupled to, but not structurally integrated with, other components of stereoscopic image display system 200. For example, 360° camera 234 may be strategically situated in a venue local to stereoscopic image display system 200 to capture images of the local venue, as well as locations, gestures, and/or facial expressions by users 224a, 224b, and 224c. It is further noted that in implementations in which 360° camera 234 is not structurally integrated with another component of stereoscopic image display system 200, the position of 360° camera 234 with respect to stereoscopic image display system 200 must be known before operation, or supplied during operation.

Alternatively, in some implementations, 360° camera 234 may be mounted on or otherwise integrated with autostereoscopic display 218 and may rotate with autostereoscopic display 218 and rotor 244. In yet other implementations, 360° camera 234 may be mounted on or otherwise integrated with stationary base 240. In various implementations, 360° camera 234 may be in wired or wireless communication with computing platform 202 and may be controlled by CPU 212.

As further shown in FIG. 2A, in some implementations, stereoscopic image display system 200 may further include an image capture device including laser 232 communicatively coupled to computing platform 202 and configured to rotate with autostereoscopic display 218. Laser 232 may be controlled by CPU 212 and may be implemented in conjunction with a laser sensor included in sensor network 250 (laser sensor not shown in FIG. 2A) to function as a Lidar type probe for determining the locations of users 234a, 234b, and 234c relative to autostereoscopic display 218.

It is noted that sensor network 250 is described in greater detail below by reference to FIGS. 2B and 2C, while various implementations of autostereoscopic display 218 including display screen 228 are described below by reference to FIGS. 3A, 3B, and 3C.

Figure 2B:
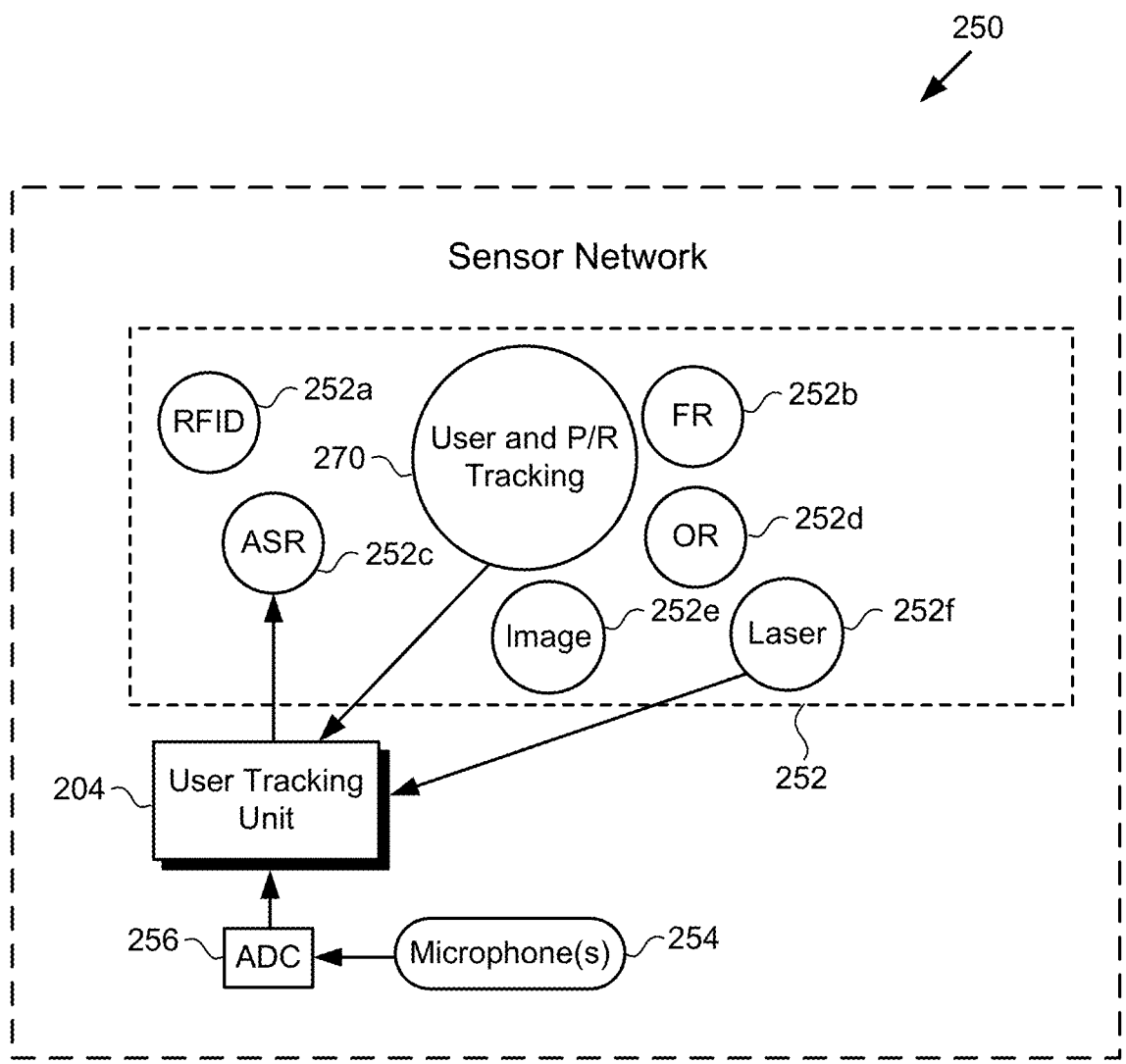
FIG. 2B shows a diagram of an exemplary sensor network suitable for use as part of the stereoscopic image display system of FIG. 2A, according to one implementation.

FIG. 2B shows a more detailed exemplary implementation of sensor network 250, in FIG. 2A. As shown in FIG. 2B, sensor network 250 includes multiple sensors 252 controlled by CPU 212 of computing platform 202. According to the exemplary implementation shown in FIG. 2B, sensor network 250 includes one or more microphone(s) 254, analog-to-digital converter (ADC) 256, and user tracking unit 204, in addition to multiple sensors 252. As further shown in FIG. 2B, sensors 252 of sensor network 250 may include radio-frequency identification (RFID) sensor 252a, facial recognition (FR) sensor 252b, automatic speech recognition (ASR) sensor 252c, object recognition (OR) sensor 252d, image sensor 252e, laser sensor 252f, and one or more user and position/rate (PR) tracking sensor(s) 270.

It is noted that the specific sensors shown to be included among sensors 252 of sensor network 250 are merely exemplary, and in other implementations, sensors 252 of sensor network 250 may include more, or fewer, sensors than RFID sensor 252a, FR sensor 252b, ASR sensor 252c, OR sensor 252d, image sensor 252e, laser sensor 252f, and user and P/R tracking sensor(s) 270. RFID sensor 252a, FR sensor 252b, ASR sensor 252c, OR sensor 252d, image sensor 252e, laser sensor 252f, and user and P/R tracking sensor(s) 270 may be implemented using any suitable sensors for those respective functions, as known in the art. Microphone(s) 254 may include one or more stationary and/or moving microphone(s). For example, stationary microphone(s) of microphone(s) 254 may be distributed in a 360° array surrounding base 240 to enhance directional sensing of sound, such as speech, produced by one or more of users 224a, 224b, and 224c.

In some implementations, one or more moving microphone(s) of microphone(s) 254 may rotate in synchronization with rotor 244 for autostereoscopic display 218. In those implementations, user and P/R tracking sensor(s) 270 may be used in combination with microphone(s) 254 to identify the direction from which a sound sensed using microphone(s) 254 is received.

Image sensor 252e may correspond to one or more sensors for obtaining visual images of users 224a, 224b, and 224c, as well as their respective locations relative to autostereoscopic display 218. Image sensor 252e may implemented as one or more stationary and/or rotating video cameras, for example, or as a vertical array of image capture pixels controlled by a physical or global electronic shutter and configured to rotate with autostereoscopic display 218.

As indicated in FIG. 2B, in some implementations, data from user and P/R tracking sensor(s) 270, and/or data from laser sensor 252f, and/or data generated by ADC 256 from sounds detected by microphone(s) 254 may be processed by user tracking unit 204 to identify the respective locations of users 224a, 224b, and 224c relative to autostereoscopic display 218. In those implementations, the output from user tracking unit 204 may be provided to ASR sensor 252c to enhance the performance of ASR sensor 252c in discriminating among environmental sounds, noise, and purposeful speech by one or more of users 224a, 224b, and 224c.

Figure 2C:
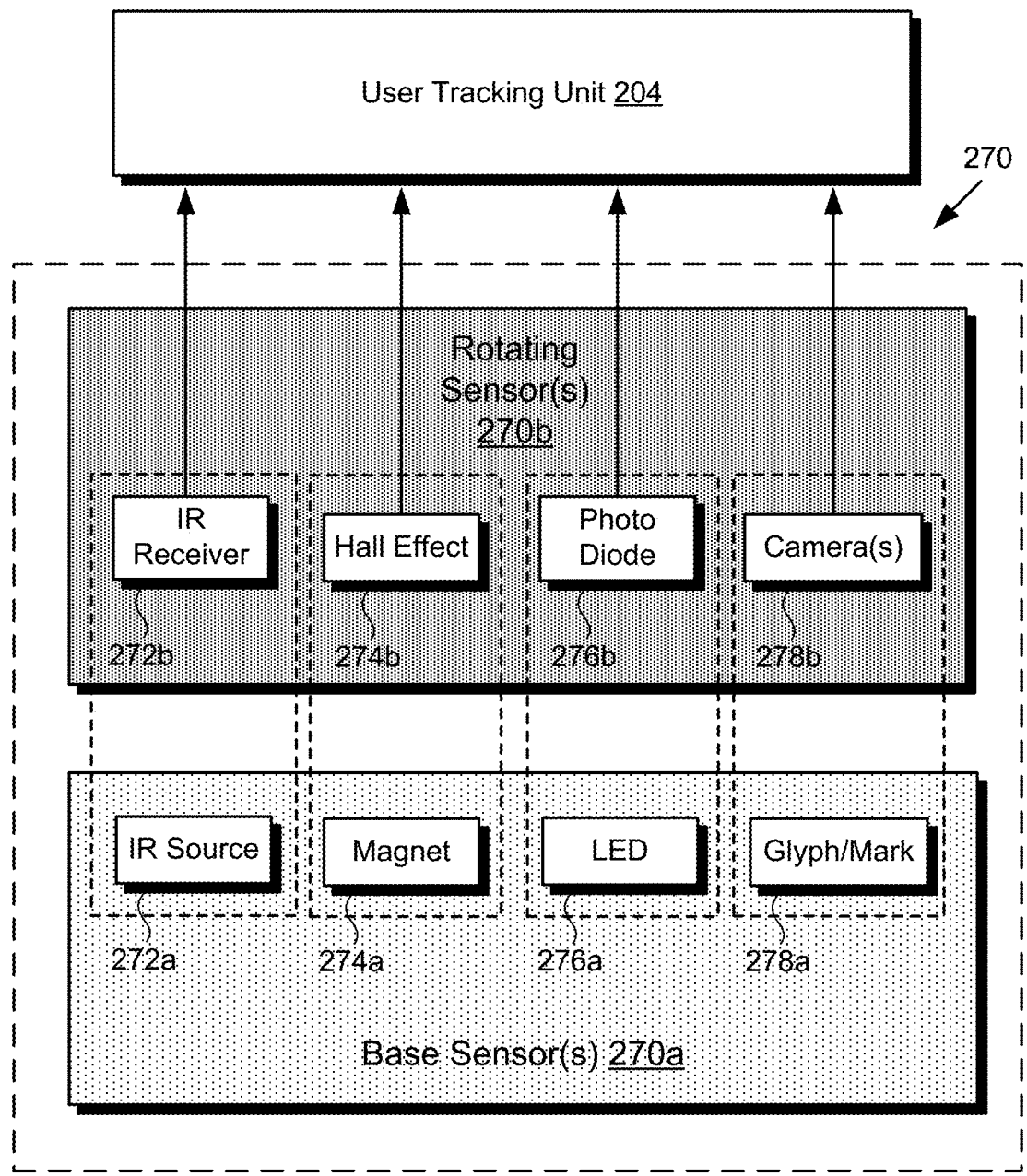
FIG. 2C shows a diagram of exemplary user and position and/or rate (P/R) tracking sensors suitable for use as part of the stereoscopic image display system of FIG. 2A, according to one implementation.

FIG. 2C shows a more detailed exemplary implementation of user and P/R tracking sensor(s) 270, in FIG. 2B. As shown in FIG. 2C, user and P/R tracking sensor(s) 270 can include one or more base sensor(s) 270a integrated with base 240, and one or more rotating sensor(s) 270b integrated with autostereoscopic display 218 and configured to rotate with autostereoscopic display 218. Also shown in FIG. 2C is user tracking unit 204.

According to the exemplary implementation shown in FIG. 2C, base sensor(s) 270a may include one or more of infrared (IR) light source 272a, magnet 274a, visible light LED 276a, and glyph or other visible marker 278a, to name a few examples. As further shown in FIG. 2C, rotating sensor(s) 270b may include one or more of IR receiver 272b for sensing IR light source 272a, Hall effect sensor 274b for sensing magnet 274a, photo diode 276b for sensing visible light LED 276a, and one or more camera(s) 278b for sensing glyph or visible marker 278a. Moreover, in various implementations, rotating sensor(s) 270b may include any other suitable mechanical rotary position sensor.

It is noted that the distribution of features identified by reference numbers 272a, 274a, 276a, 278a, 272b, 274b, 276b, and 278b between base sensor(s) 270a and rotating sensor(s) 270b is merely exemplary. In another implementation, for example, the positions of features 272a, 274a, 276a, 278a, 272b, 274b, 276b, and 278b may be reversed. That is to say, one or more of IR light source 272a, magnet 274a, visible light LED 276a, and glyph or visible marker 278a may be included as rotating sensor(s) 270b, while one or more of IR receiver 272b, Hall effect sensor 274b, photo diode 276b, and camera(s) 278b may be included as base sensor(s) 270a. It is further noted that camera(s) 278b may include one or more still camera(s) and/or one or more video camera(s), for example.

In implementations in which stereoscopic image display system 200 is implemented in a home or office environment, for example, 3D image 258 may be provided as a virtual character designed to serve as an artificial intelligence (AI) assistant to one or more of users 224a, 224b, and 224c. In those implementations, voice commands, for example, issued by one or more of users 224a, 224b, and 224c may be interpreted using software code 208 and ASR sensor 252c, and may be executed by stereoscopic image display system 200 to control one or more smart home or office devices, such as TVs, stereos, or other media devices.

As a specific example, in one such implementation, as discussed above, IR source 272a can be integrated with base 240 or may be configured to rotate with autostereoscopic display 218. Under those circumstances, devices in the surrounding area of autostereoscopic display 218 can receive control commands without requiring WiFi control support. This would allow stereoscopic image display system 200 to act as a universal remote. Users 224a, 224b, and/or 224c do not need to point a remote control at the controlled media device. In implementations in which IR source 272a rotates with autostereoscopic display 218, the rotation of autostereoscopic display 218 allows the signal to be emitted over a 360 degree sweep around the room. Users 224a, 224b, and/or 224c can speak commands such as "Assistant, turn on TV" or "Assistant, switch output to game", and stereoscopic image display system 200 will process the command into the necessary IR signal for the controlled device. Moreover, in some implementations, IR receiver 272b, whether integrated with base 240 or configured to rotate with autostereoscopic display 218, may be utilized to receive inputs from media devices in its surrounding environment.

As indicated in FIG. 2C, in some implementations, data from one or more of IR receiver 272b, Hall effect sensor 274b, photo diode 276b, and camera(s) 278b is processed by user tracking unit 204 to identify the rotational position of display autostereoscopic display 218, as well as the locations of users 224a, 224b, and 224c relative to autostereoscopic display 218. In those implementations, the output from user tracking unit 204 may be provided to software code 208 to enhance the performance of stereoscopic image display system 200 in rendering 3D image 258 corresponding to output image 222 for each of users 224a, 224b, and 224c.

Figure 3A:
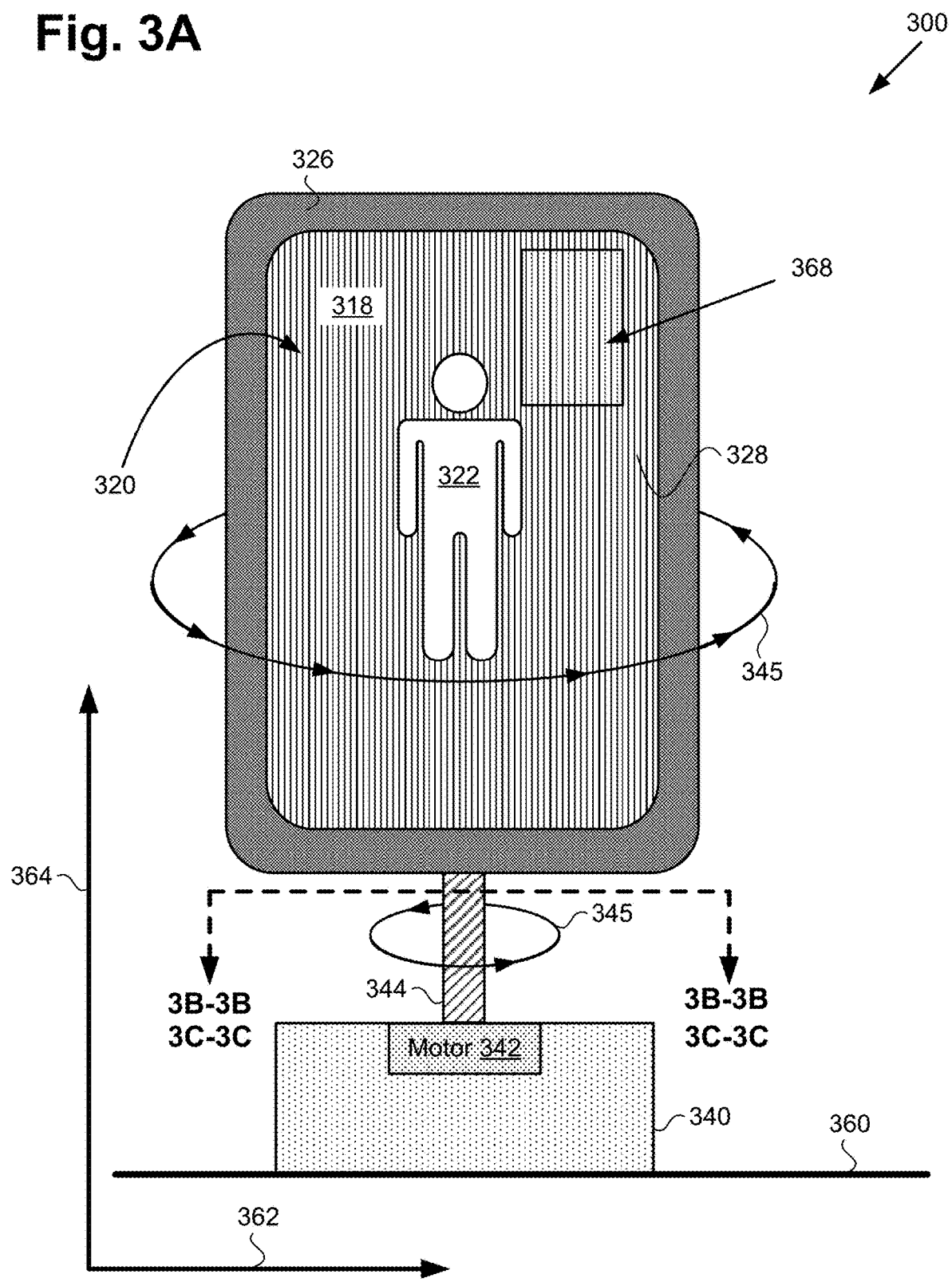
FIG. 3A shows a diagram of an exemplary stereoscopic image display system, according to one implementation.

FIG. 3A shows a diagram of exemplary stereoscopic image display system 300, according to another implementation. As shown in FIG. 3A, stereoscopic image display system 300 includes base 340 and autostereoscopic display 318. Base 340 is shown to include motor 342, and to be situated on surface 360, which may be a floor or any other substantially horizontal surface. In addition, according to the exemplary implementation shown in FIG. 3A, stereoscopic image display system 300 includes rotor 344 coupling base 340 to autostereoscopic display 318.

Autostereoscopic display 318 includes display screen 328 having optional autostereoscopic surface layer 320 and optional privacy filter 368 affixed over display screen 328. In addition, FIG. 3A shows output image 322 of content being played out by stereoscopic image display system 300. Also shown in FIG. 3A are horizontal axis 362 substantially parallel to surface 360, vertical axis 364 substantially perpendicular to surface 360, spin direction 345 of rotor 344 and autostereoscopic display 318, mobile communication device 326 integrated with autostereoscopic display 318, and perspective lines 3B-3B and 3C-3C.

Stereoscopic image display system 300 corresponds in general to stereoscopic image display system 200, in FIG. 2A. As a result, stereoscopic image display system 300 may share any of the characteristics attributed to stereoscopic image display system 200 by the present disclosure, and vice versa. For example, like stereoscopic image display system 200, stereoscopic image display system 300 includes sensor network 250 bridging base 340 and autostereoscopic display 318. In addition, rotor 344, base 340, motor 342, and output image 322, in FIG. 3A correspond in general to rotor 244, base 240, motor 242, and output image 222 in FIG. 2A. Thus, rotor 344, base 340, motor 342, and output image 322 may share any of the characteristics attributed to rotor 244, base 240, motor 242, and output image 222 by the present disclosure, and vice versa. That is to say, for example, although not explicitly shown in FIG. 3A, base 340 includes features corresponding respectively to motor controller circuit 248 and MCU 246.

Moreover, autostereoscopic display 318 including display screen 328 corresponds in general to autostereoscopic display 218 including display screen 228, in FIG. 2A. Thus, autostereoscopic display 318 may share any of the characteristics attributed to autostereoscopic display 218 by the present disclosure, and vice versa. In other words, although not explicitly shown in FIG. 3A, autostereoscopic display 318 includes features corresponding respectively to computing platform 202 including ASIC 210 having CPU 212, GPU 214, and DSP 216, and system memory 206 storing software code 208. In addition, computing platform 202 of autostereoscopic display 318 may be communicatively coupled to one or more of external lighting 236, audio system 238, 360° degree camera 234, and laser 232.

Furthermore, like autostereoscopic display 318, autostereoscopic display 218 may include optional autostereoscopic surface layer 320 and/or optional privacy filter 368. With respect to the term "privacy filter," as used in the present application, privacy filter refers to a film or a structure, such as a louvered structure, affixed to a display screen so as to prevent viewing of the display screen outside of a predetermined viewing angle.

Regarding autostereoscopic surface layer 320, it is noted that in some implementations, autostereoscopic display 218/318 may be inherently autostereoscopic, in which use case autostereoscopic surface layer 320 may be omitted. For example, in one implementation, autostereoscopic display 218/318 may take the form of a compressive light field display omitting autostereoscopic surface layer 320. However, in other implementations, auto stereoscopic display 218/318 may include display screen 228/328 configured to render 2D images, such as an LCD display screen or an OLED display screen for example, and may include autostereoscopic surface layer 320. In those latter implementations, autostereoscopic surface layer 320 may take the form of a lenticular lens or a parallax barrier, for example, substantially covering display screen 228/328.

Referring to FIGS. 2A and 3A in combination, display screen 228/328 may be controlled by CPU 212 and/or GPU 214 of ASIC 210, while rotor 244/344 coupled to autostereoscopic display 218/318 is controlled by CPU 212 of ASIC 210. According to the exemplary implementation shown in FIGS. 2A and 3A, spinning of autostereoscopic display 218/318 on which output image 222/322 is rendered results in generation of 3D image 258 corresponding to output image 222/322. That is to say, CPU 212 is configured to execute software code 208 to utilize motor 242/342 to spin rotor 244/344 and autostereoscopic display 218/318 about vertical axis 264/364 at a predetermined spin rate to generate 3D image 258 for each of users 224a, 224b, and 224c that corresponds to output image 322.

In some implementations, computing platform 202 and autostereoscopic display 218/318 may be integrated with mobile communication device 326 configured to spin with rotor 244/344. For example, computing platform 202 and autostereoscopic display 218/318 may be integrated with mobile communication device 326 in the form of a smartphone or a tablet computer. It is noted that although display screen 228/328 is depicted as a substantially flat display screen in FIG. 3A, that representation is merely exemplary. In various implementations, display screen 228/328 may be substantially flat, or may have a convex or concave display surface.

In the implementations shown in FIGS. 2A and 3A, various features and/or techniques may be utilized to reduce flicker and/or blur of 3D image 258 generated by autostereoscopic display 218/318. For example, optional privacy filter 368 may be affixed over display screen 228/328 so as to restrict viewing of display screen 228/328 outside of a predetermined viewing angle. Optional privacy filter 368 may take the form of a louvered structure affixed over display screen 228/328, or to a privacy film covering display screen 228/328.

It is noted that CPU 212 may execute software code 208 to control motor 242/342 in order to spin rotor 244/344 and autostereoscopic display 218/318 about vertical axis 264/364 at a varying spin rate, or at a substantially constant predetermined spin rate. It is also noted that spin direction 345 may be in either a counter clockwise direction with respect to the plane of horizontal axis 262/362, as shown in FIG. 3A, or in a clockwise direction with respect to that plane. It is further noted that the display image plane of autostereoscopic display 218/318 substantially coincides with the axis of rotation of rotor 244/344.

Figure 3B:
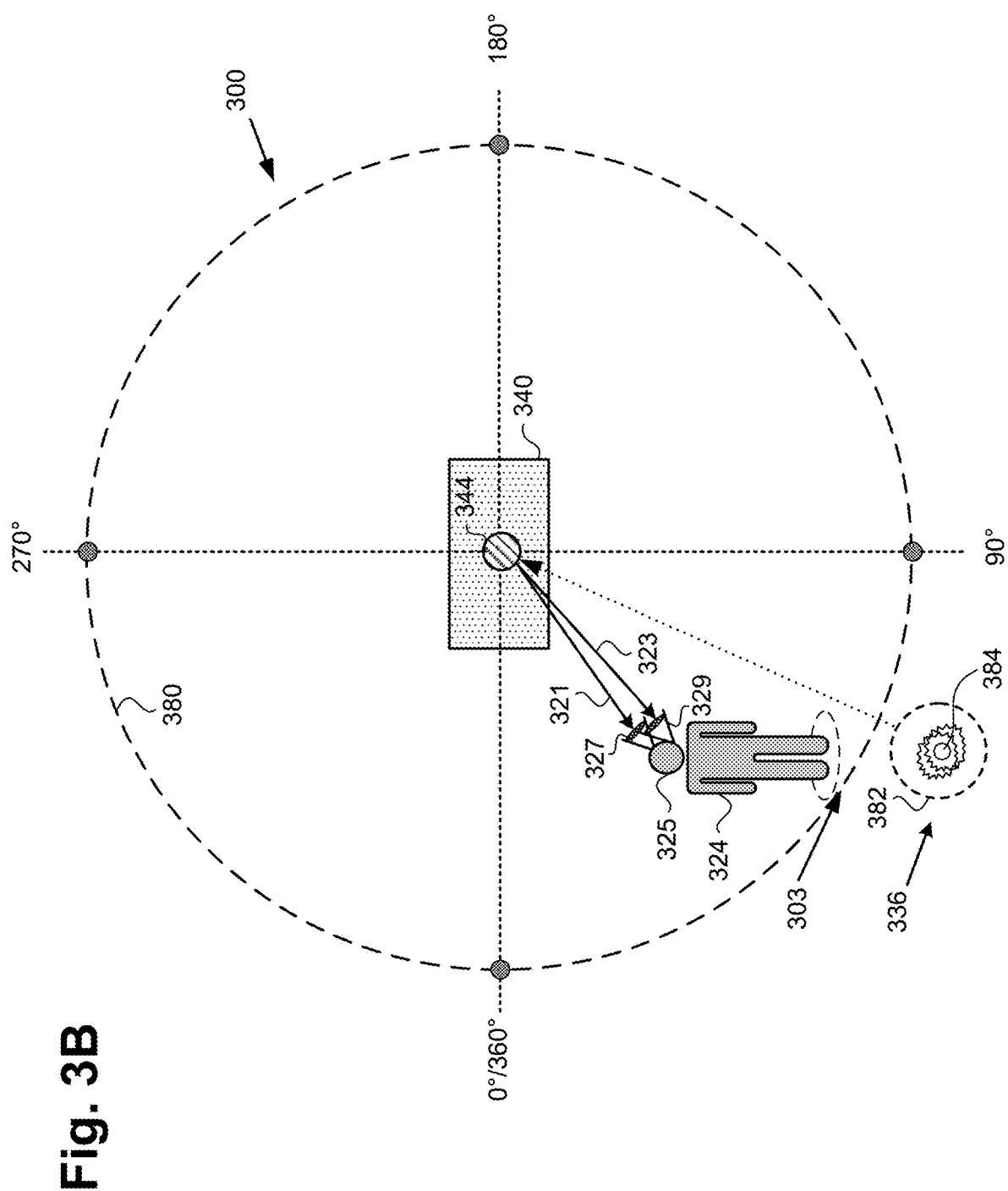
FIG. 3B shows an exemplary single user use case for the stereoscopic image display systems of FIGS. 2A and 3A, according to one implementation.

FIG. 3B shows an exemplary single user use case for the stereoscopic image display systems of FIGS. 2A and 3A, according to one implementation. FIG. 3B shows a top view of a single perspective image viewing environment including stereoscopic image display system 200/300 along perspective lines 3B-B in FIG. 3A. It is noted that autostereoscopic display 218/318, motor 242/342, motor controller circuit 248 including MCU 246, sensor network 250, and computing platform 202 are not shown in FIG. 3B in the interests of conceptual clarity.

As shown in FIG. 3B, the single perspective image viewing environment also includes circle 380 of exemplary angular or azimuthal locations (hereinafter "angular locations") from which user 324 having head 325, left eye 327, and right eye 329 may view 3D image 258 generated by autostereoscopic display 218/318, including angular location 303 of user 324. Also shown in FIG. 3B are base 240/340 and rotor 244/344 of stereoscopic image display system 200/300, external lighting 336 including shutter 382 and light source 384, and respective left and right eye images 321 and 323 corresponding to output image 222/322. It is noted that circle 380 of exemplary angular locations for viewing 3D image 258 generated by autostereoscopic display 218/318 is substantially concentric with rotor 244/344. It is further noted that user 324 corresponds to any one of users 224a, 224b, and 224c, in FIG. 2A.

In some exemplary use cases, user 324 may be at angular location 303 displaced by some angle from a predetermined zero crossing of circle 380, i.e., 0° or 360° along the circumference of circle 380, as detectable using sensor network 250. In one or more of those use cases, CPU 212 of ASIC 210 may be configured to recalibrate circle 380 to have its zero crossing substantially coincide with angular location 303 of user 324.

According to the implementations shown by FIGS. 2A, 2B, 2C, 3A, and 3B, CPU 212 executes software code 208 to spin autostereoscopic display 218/318 about the spin axis of rotor 244/344 at a particular spin rate using motor 242/342 and rotor 244/344. User tracking unit 204 is controlled by CPU 212 of ASIC 210 and is utilized by software code 208 to identify angular location 303 of user 324 relative to circle 380 concentric with the spin axis of rotor 244/344. For example, user tracking unit 204 may receive data from 360° degree camera 234, laser sensor 252f, and/or microphones 254 for identifying angular location 303 of user 324. User tracking unit 204 is also utilized by software code 208 to perform head tracking and/or eye tracking of user 324. For example, user tracking unit 204 may receive sensor data from user and P/R tracking sensor(s) 270 for detecting reflected light from left eye 327 and right eye 329 of user 324.

Thus, software code 208, executed by CPU 212 of ASIC 210, utilizes user tracking unit 204 to detect the respective locations of left eye 327 and right eye 329 of user 324 relative to angular location 303. Based on the locations of left eye 327 and right eye 329, software code 208 is further executed by CPU 212 of ASIC 210 to determine left eye image 321 and right eye image 323 corresponding to output image 222/322. In addition, software code 208 may be executed by CPU 212 of ASIC 210 to utilize GPU 214 to render left eye image 321 and right eye image 323 using autostereoscopic display 218/318, while autostereoscopic display 218/318 spins, when autostereoscopic display 218/318 substantially faces user 324 as determined based on angular location 303 of user 324 and the spin rate of rotor 244/344. Left eye image 321 and right eye image 323 rendered using autostereoscopic display 218/318 produce 3D image 258 of output image 222/322 for user 324.

In some implementations, stereoscopic image display system 200/300 may utilize external lighting 236/336 to reduce flicker and/or blur of 3D image 258. For example, software code 208 and CPU 212 of ASIC 210 may control shutter 382 of external lighting 236/336 to cause light source 384 to strobe autostereoscopic display 218/318 when autostereoscopic display 218/318 substantially faces user 324. Alternatively, in some implementations, external lighting 236/336 may be omitted, and software code 208 and CPU 212 of ASIC 210 may control a backlight of display screen 228/328 to strobe autostereoscopic display 218/318 when autostereoscopic display 218/318 substantially faces user 324.

Thus, strobing of auto stereoscopic display 218/318 using control shutter 382 and light source 384, or a backlight of display screen 228/328 minimizes motion blur from rotation of autostereoscopic display 218/318 by causing user 324 to perceive static imagery. For example, the illumination provided by the strobing of autostereoscopic display 218/318 may illuminate display screen 228/328 for less than one millisecond (<1.0 msec.) when auto stereoscopic display 218/318 substantially faces user 324.

For example, 360° degree camera 234 may rotate with rotor 244/344 and autostereoscopic display 218/318, and may pass captured imagery to computing platform 202 configured to use an image classification algorithm of user tracking unit 204 to identify angular location 303 of user 324. Based upon input from user and P/R tracking sensor(s) 270, such as Hall effect sensor 274b or an optical encoder, computing platform 202 strobes on the backlight display or control shutter 382 only at angular locations where users are positioned, such as angular location 303 of user 324, in order to minimize motion blur. Further, based upon input from 360° degree camera 234 and user and P/R tracking sensor(s) 270, software code 208 is executed by CPU 212 of ASIC 210 to determine left eye image 321 and right eye image 323 that are correct for the perspective of user 324.

Figure 3C:
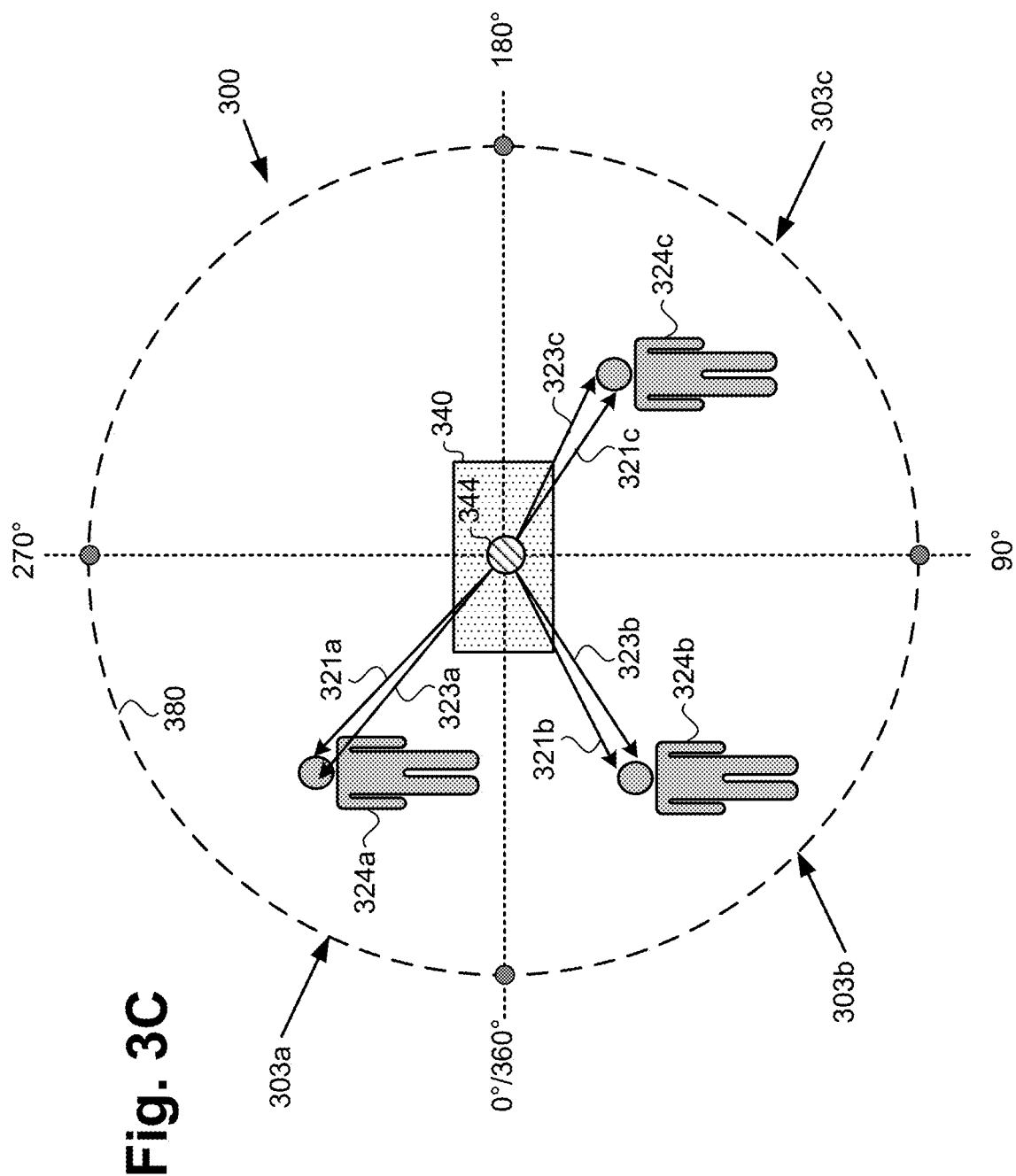
FIG. 3C shows an exemplary multi-user use case for the stereoscopic image display systems of FIGS. 2A and 3A, according to one implementation.

FIG. 3C shows an exemplary multi-user use case for the stereoscopic image display systems of FIGS. 2A and 3A, according to one implementation. FIG. 3C shows a top view of a multi-perspective image viewing environment including stereoscopic image display system 200/300 along perspective lines 3C-C in FIG. 3A. It is noted that autostereoscopic display 218/318, motor 242/342, motor controller circuit 248 including MCU 246, sensor network 250, and computing platform 202 are not shown in FIG. 3C in the interests of conceptual clarity.

As shown in FIG. 3C, the multi-perspective image viewing environment also includes circle 380 of exemplary angular locations from which user 324a, 324b, and 324c may view 3D image 258 generated by autostereoscopic display 218/318, including angular locations 303a, 303b, and 303c of respective users 324a, 324b, and 324c. Also shown in FIG. 3C are base 240/340 and rotor 244/344 of stereoscopic image display system 200/300, and left and right eye images 321a and 323a, 321b and 323b, and 321c and 323c corresponding to output image 222/322. It is noted that circle 380 of exemplary angular locations for viewing 3D image 258 generated by autostereoscopic display 218/318 is substantially concentric with rotor 244/344. It is further noted that users 324a, 324b, and 324c correspond respectively to users 224a, 224b, and 224c, in FIG. 2A, while left and right eye images 321a and 323a, 321b and 323b, and 321c and 323c correspond respectively to left and right eye images 221a and 223a, 221b and 223b, and 221c and 223c.

In some exemplary use cases, each of users 224a/324a, 224b/324b, and 224c/324c may be at respective angular locations 303a, 303b, 302c displaced from a predetermined zero crossing of circle 380, i.e., 0° or 360° along the circumference of circle 380, as detectable using sensor network 250. In one or more of those use cases, CPU 212 of ASIC 210 may be configured to recalibrate circle 380 to have its zero crossing substantially coincide with one of angular locations 303a, 303b, and 303c.

According to the implementations shown by FIGS. 2A, 2B, 2C, 3A, and 3B, CPU 212 executes software code 208 to spin autostereoscopic display 218/318 about the spin axis of rotor 244/344 at a particular spin rate using motor 242/342 and rotor 244/344. User tracking unit 204 is controlled by CPU 212 of ASIC 210 and is utilized by software code 208 to identify angular locations 303a, 303b, and 303c of each of respective users 224a/324a, 224b/324b, and 224c/324c relative to circle 380 concentric with the spin axis of rotor 244/344. For example, user tracking unit 204 may receive data from 360° degree camera 234, laser sensor 252f, and/or microphones 254 for identifying angular location 303a, 303b, and 303c of respective users 224a/324a, 224b/324b, and 224c/324c.

User tracking unit 204 is also utilized by software code 208 to perform head tracking and/or eye tracking of users 224a/324a, 224b/324b, and 224c/324c. For example, user tracking unit 204 may receive sensor data from user and P/R tracking sensor(s) 270 for detecting reflected light from the left and right eyes of each of users 224a/324a, 224b/324b, and 224c/324c.

That is to say, software code 208, executed by CPU 212 of ASIC 210, utilizes user tracking unit 204 to detect the respective locations of the left eye and the right eye of each of users 224a/324a, 224b/324b, and 224c/324c relative to their respective angular locations 303a, 303b, and 303c. Based on the locations of the left eye and right eye of each of users 224a/324a, 224b/324b, and 224c/324c, software code 208 is further executed by CPU 212 of ASIC 210 to determine left eye image 221a/321a and right eye image 223a/323a, left eye image 221b/321b and right eye image 223b/323b, and left eye image 221c/321c, and right eye image 223c/323c corresponding to output image 222/322.

In addition, software code 208 may be executed by CPU 212 of ASIC 210 to utilize GPU 214 to render left eye image 221a/321a and right eye image 223a/323a, left eye image 221b/321b and right eye image 223b/323b, and left eye image 221c/321c, and right eye image 223c/323c using autostereoscopic display 218/318, while autostereoscopic display 218/318 spins, when autostereoscopic display 218/318 substantially faces respective users 224a/324a, 224b/324b, and 224c/324c as determined based on angular location 303a, 303b, and 303c of respective users 224a/324a, 224b/324b, and 224c/324c, and the spin rate of rotor 244/344. Thus, left eye image 221a/321a and right eye image 223a/323a are rendered when autostereoscopic display 218/318 substantially faces user 224a/324a, left eye image 221b/321b and right eye image 223b/323b are rendered when autostereoscopic display 218/318 substantially faces user 224b/324b, and left eye image 221c/321c and right eye image 223c/323c are rendered when autostereoscopic display 218/318 substantially faces user 224c/324c.

Left eye image 221a/321a and right eye image 223a/323a rendered using autostereoscopic display 218/318 produce 3D image 258 of output image 222/322 for user 224a/324a that corresponds to the location of user 224a/324a relative to autostereoscopic display 218/318. Similarly, left eye image 221b/321b and right eye image 223b/323b, and left eye image 221c/321c and right eye image 223c/323c rendered using autostereoscopic display 218/318 produce 3D image 258 of output image 222/322 for respective users 224b/324b and 224c/324c that correspond to their respective locations relative to autostereoscopic display 218/318.

In some implementations, CPU 212 may execute software code 208 to use GPU 214 to modify output image 222/322 as rotor 244/344 and autostereoscopic display 218/318 rotate, so as to generate multiple distinct views of 3D image 258 that are appropriate respectively to the locations of each of users 224a/324a, 224b/324b, and 224c/324c. For example, user 224a/324a located so as to face a front view of 3D image 258 and stationary at that location might consistently view 3D image 258 as if from the front. By contrast, user 224c/324c located so as to face a backside of 3D image 258, i.e., approximately 180° apart from the perspective of user 224a/324a, and stationary at that location might consistently view 3D image 258 as if from the rear.

As noted above, in some implementations, stereoscopic image display system 200/300 may utilize a lighting effect to reduce flicker and/or blur of 3D image 258. For example, software code 208 and CPU 212 of ASIC 210 may control a backlight of display screen 228/328 to strobe autostereoscopic display 218/318 when autostereoscopic display 218/318 substantially faces each of users 224a/324a, 224b/324b, and 224c/324c.

For example, and as noted above, 360° degree camera 234 may rotate with rotor 244/344 and autostereoscopic display 218/318, and may pass captured imagery to computing platform 202 configured to use an image classification algorithm of user tracking unit 204 to identify angular locations 303a, 303b, and 303c of each of respective users 224a/324a, 224b/324b, and 224c/324c. Based upon input from user and P/R tracking sensor(s) 270, such as Hall effect sensor 274b or an optical encoder, computing platform 202 strobes on the backlight display or control shutter 382 only at angular locations where users 224a/324a, 224b/324b, and 224c/324c are positioned, such as angular locations 303a, 303b, and 303c, in order to minimize motion blur. Further, based upon input from the 360° degree camera 234 and user and P/R tracking sensor(s) 270, software code 208 is executed by CPU 212 of ASIC 210 to determine left eye image 221a/321a and right eye image 223a/323a, left eye image 221b/321b and right eye image 223b/323b, and left eye image 221c/321c, and right eye image 223c/323c that are correct for the perspectives of respective users 224a/324a, 224b/324b, and 224c/324c.

For example, if two users, i.e., users 224a/324a and 224c/324c observe the display of a human character shown as 3D image 258 from opposite sides, 360° degree camera 234 may detect their respective angular positions, CPU 212 of ASIC 210 executes software code 208 to calculate two sets of two images (LE,RE), one set of two images for the front perspective of the human character and one set of two images for the back of the character, such that each of users 224a/324a and 224c/324c would experience a full autostereoscopic image of that human charter shown from a perspective that is correct for their respective viewing positions. The strobing on and off of the display via the strobing backlight or control shutter 382 insures that each of users 224a/324a and 224c/324c sees a crisp, non-blurred image.

Thus, the present application discloses stereoscopic image display systems. By tracking a left eye location and a right eye location of a user, the stereoscopic image display systems disclosed by the present application can determine a left eye image and a right eye image for the user corresponding to an output image of content being played out by the stereoscopic image display system. By rendering the left eye image and the right eye image using an autostereoscopic display, the disclosed stereoscopic image display system generates a 3D image of the output image for the user that is adjusted for the perspective of the user. Moreover, in some implementations, by spinning the autostereoscopic display while rendering multiple perspectives of the output image during each revolution of the autostereoscopic display screen about its axis, the present display solution enables multiple users at various locations to see different 3D perspectives of the output image.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A stereoscopic image display system comprising:
an autostereoscopic display including a computing platform having at least one hardware processor and a system memory storing a software code; and
a motor coupled to a rotor for rotating the autostereoscopic display, the motor controlled by the at least one hardware processor;
the at least one hardware processor configured to execute the software code to:
spin the autostereoscopic display about a spin axis at a spin rate using the motor and the rotor;
identify an angular location of a user of the stereoscopic display system relative to a circle concentric with the spin axis;
detect a left eye location and a right eye location of the user relative to the angular location of the user;
determine a left eye image and a right eye image corresponding to an output image of a content being played out by the stereoscopic image display system based on the respective left eye location and the right eye location of the user; and
render the left eye image and the right eye image using the autostereoscopic display while spinning when the autostereoscopic display faces the user, as determined based on the angular location of the user and the spin rate.

2. The stereoscopic image display system of claim 1, wherein the left eye image and the right eye image rendered using the autostereoscopic display produce a three-dimensional (3D) image of the output image for the user.

3. The stereoscopic image display system of claim 1, wherein the autostereoscopic display comprises a display screen configured to render two-dimensional (2D) images, having one of a lenticular lens or a parallax barrier covering the display screen.

4. The stereoscopic image display system of claim 3, wherein the display screen is one of a liquid-crystal display (LCD) screen or an organic light-emitting diode (OLED) display screen.

5. The stereoscopic image display system of claim 1, wherein the autostereoscopic display comprises a compressive light field display.

6. The stereoscopic image display system of claim 1, further comprising a privacy filter affixed over a display screen of the autostereoscopic display.

7. The stereoscopic image display system of claim 1, wherein the at least one hardware processor is further configured to execute the software code to strobe the autostereoscopic display using at least one of a backlight of the autostereoscopic display or an external light source when the autostereoscopic display faces the user.

8. The stereoscopic image display system of claim 1, wherein the autostereoscopic display is integrated with one of a smartphone or a tablet computer.

9. A stereoscopic image display system comprising:
an autostereoscopic display including a computing platform having at least one hardware processor and a system memory storing a software code; and
a motor coupled to a rotor for rotating the autostereoscopic display, the motor controlled by the at least one hardware processor;
the at least one hardware processor configured to execute the software code to:
spin the autostereoscopic display about a spin axis at a spin rate using the motor and the rotor;

identify an angular location of each of a plurality of users of the stereoscopic display system relative to a circle concentric with the spin axis;

detect a left eye location and a right eye location of each of the plurality of users relative to the angular location of the each of the plurality of users;

determine a left eye image and a right eye image corresponding to an output image of a content being played out by the stereoscopic image display system for each of the plurality of users based on the respective left eye location and the right eye location of the each of the plurality of users; and render the left eye image and the right eye image for each of the plurality of users, using the autostereoscopic display while spinning, the autostereoscopic display faces the each of the plurality of users, as determined based on the angular location of the each of the plurality of users and the spin rate.

10. The stereoscopic image display system of claim 9, wherein the left eye image and the right eye image rendered using the autostereoscopic display produce a three-dimensional (3D) image of the output image for the each of the plurality of users.

11. The stereoscopic image display system of claim 9, wherein the autostereoscopic display comprises a display screen configured to render two-dimensional (2D) images, having one of a lenticular lens or a parallax barrier covering the display screen.

12. The stereoscopic image display system of claim 11, wherein the display screen is one of a liquid-crystal display (LCD) screen or an organic light-emitting diode (OLED) display screen.

13. The stereoscopic image display system of claim 9, wherein the autostereoscopic display comprises a compressive light field display.

14. The stereoscopic image display system of claim 9, further comprising a privacy filter affixed over a display screen of the autostereoscopic display.

15. The stereoscopic image display system of claim 9, wherein the at least one hardware processor is further configured to execute the software code to strobe the autostereoscopic display using a backlight of the autostereoscopic display when the autostereoscopic display faces the each of the plurality of users.

* * * * *